United States Patent [19]

Minke

[11] 4,053,081
[45] Oct. 11, 1977

[54] REINFORCED FILAMENT-WOUND CUT-PORT PRESSURE VESSEL AND METHOD OF MAKING SAME

[75] Inventor: Charles M. Minke, Cumberland, Md.

[73] Assignee: The United States of America as represented by the Secretary of the Navy, Washington, D.C.

[21] Appl. No.: 716,481

[22] Filed: Aug. 20, 1976

[51] Int. Cl.² ............................................. B65H 81/06
[52] U.S. Cl. .......................................... 220/3; 220/71; 220/73; 156/175; 156/429; 242/7.02
[58] Field of Search ................... 220/3, 73, 72, 71, 83; 156/172, 173, 175, 429; 242/7.02

[56] References Cited

U.S. PATENT DOCUMENTS

| | | | |
|---|---|---|---|
| 2,479,828 | 8/1949 | Geckler | 220/3 X |
| 3,047,191 | 7/1962 | Young | 220/83 |
| 3,083,864 | 4/1963 | Young | 220/83 |
| 3,334,780 | 8/1967 | Leer et al. | 220/3 |
| 3,360,411 | 12/1967 | Ponemon | 220/3 |
| 3,776,409 | 12/1973 | Pearson | 220/3 |
| 3,866,792 | 2/1975 | Minke | 220/72 |
| 3,908,851 | 9/1975 | Jacobs | 220/3 |

*Primary Examiner*—William Price
*Assistant Examiner*—Joseph Man-Fu Moy
*Attorney, Agent, or Firm*—Richard S. Sciascia; Paul N. Critchlow

[57] ABSTRACT

The fabricated pressure vessel is a filament wound structure having a constant winding angle assuring maximum filament utilization efficiency and also having polar end openings of different sizes. Fabrication of the vessel includes a first step of forming a structure having filament windings and identically-sized polar openings equal to or less than the smaller of the openings dictated by the design. Identical openings permit the constant winding angle. In the winding operation, wafer-like mats formed of dimensionally-stable material are interspersed between the filament layers at each polar end. In the final step, the polar openings then are machined to the desired size. The interspersed mats encircle the polar openings and reinforce the polar regions.

7 Claims, 7 Drawing Figures

REINFORCED FILAMENT-WOUND CUT-PORT PRESSURE VESSEL AND METHOD OF MAKING SAME

BACKGROUND OF THE INVENTION

The present invention relates to filament-wound pressure vessels and, in particular, to the formation of pressure vessels having differently-sized polar end openings.

Filament wound pressure vessels are rather widely used and their fabrication fully discussed in a number of prior art patents. In particular, U.S. Pat. No. 3,083,864, issued Apr. 2, 1963 to R. E. Young discloses a vessel similar to present vessel and it also discloses the winding technique used in its fabrication. As there shown, the vessel is an elongate structure, having a cylindrical body portion and symmetrical ovaloid ends which usually are referred to as polar ends. The entire structure is filament wound, or in other words, formed of a continuously wound filamentary material which, for example, may be provided by a graphite fiber winding or the like that is passed at a constant helical winding angle across the ends and length of the vessel. One significant aspect of these vessels is that maximum strength and maximum fiber-utilization efficiency best are achieved by maintaining a winding path which follows the geodesic lines of the particular arcuate surface to be formed. A geodesic line, by common definition is the shortest line between two points on a mathematically derived surface. For example, a geodesic line on a sphere is a well known arc of a great circle.

To achieve the geodesic path, the windings which form the vessel must follow a constant helical winding angle. If the design of the vessel is symmetrical, the constancy of the winding angle presents no particular difficulty. However, if the design includes unsymmetrical areas, the winding angle then must be deviated and, since the line or path then becomes nongeodesic, the strength of the vessel or, in other words, its ability to resist tension forces, is reduced. As a result, additional fibers or the like then must be added to supplement the vessel's strength.

The present invention is concerned primarily with winding angle problems which arise principally when the vessel design criteria involves some lack of symmetry. In this regard, it is known that an inherent feature of a filament wound vessel is the formation of the so-called polar openings, one at each end of the vessels. In many vessels, these polar openings are identical in size so that their presence does not affect symmetry. However, in some vessels such as those intended for use as rocket motor chambers, the design frequently requires that the openings be of a widely varied size to accommodate, for example, the rocket motor nozzle at one end and an igniter at the other. Consequently, when winding rocket motor chambers with which the present invention is primarily concerned, the openings, which conventionally are formed during the winding process, involve a lack of symmetry so that the winding angle must be deviated rather than remain constant. Such a deviation, as stated, results in more helical windings on some parts of the chamber than are required and these added windings increase the overall weight of the chamber. Weight, of course, is a critical parameter in the performance of such aeronautical vehicles so that the increase obviously is undesirable. Even so, customary practice has accepted the added weight even at the expense of the performance as well as the cost factors entailed in the use of additional expensive materials.

It is therefore an object of the present invention to form a filament wound pressure vessel of a type having different sized end openings in a manner that achieves maximum strength to weight efficiency.

More specifically, an object is to provide a pressure vessel in which the filament winding angle is maintained at a constant throughout the length of the chamber.

A further object is to provide a composite filament-wound cylindrical pressure cylindrical vessel specifically adapted for use as a rocket motor chamber having polar end openings of different sizes.

Yet another object is to reduce the weight and improve the performance of rocket motors by improving efficiency of the wound structure of the rocket motor chamber.

Other objects and their attendant advantages will become more apparent in the ensuing description.

Generally considered the present invention utilizes a series of fabrication steps in forming the desired pressure level. First, a filament wound vessel having polar end openings of the same diameter is formed using a constant winding angle permitted by the symmetry of the structure. The precise diameter of the openings is a matter of choice although it should be no larger than the minimum diameter dictated by the design criteria. Finally, the end openings are machined to the larger diameter required by the design. In the machining the filament fibers are cut and weakened in the area of the opening. This area, however, is reinforced by interspersed helically wound mats of wafers. Interspersing of the mats preferably is accomplished in the winding process during which several layers of filaments are provided and the mats are bound between the layers during the winding process.

DETAILED DESCRIPTION OF THE DRAWINGS

The present invention is illustrated in the accompanying drawings of which:

DETAILED DESCRIPTION OF THE INVENTION

Figure 1:
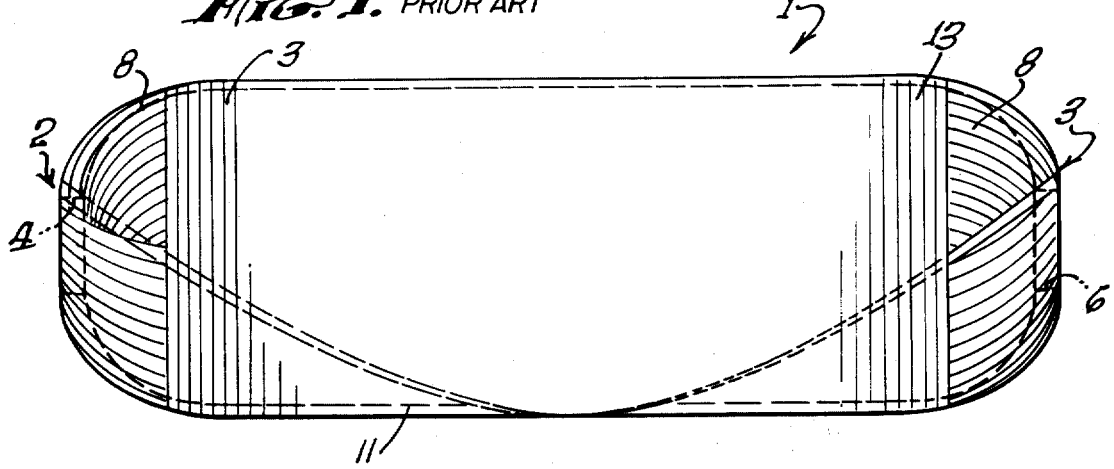
FIG. 1 is a side elevation of a pressure vessel of the type presently under consideration.
Figure 2:
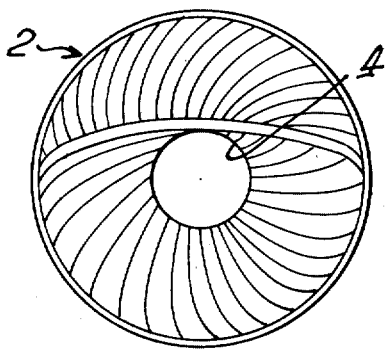
FIGS. 2 and 3 illustrate the finally-machined ends of the FIG. 1 vessel, these views illustrating the end construction as well as the fact that the polar openings at the opposite ends are of a different diameter.
Figure 3:
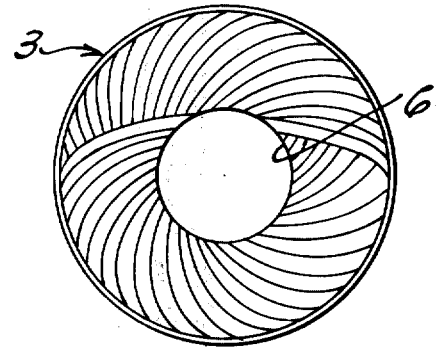
Figure 5:
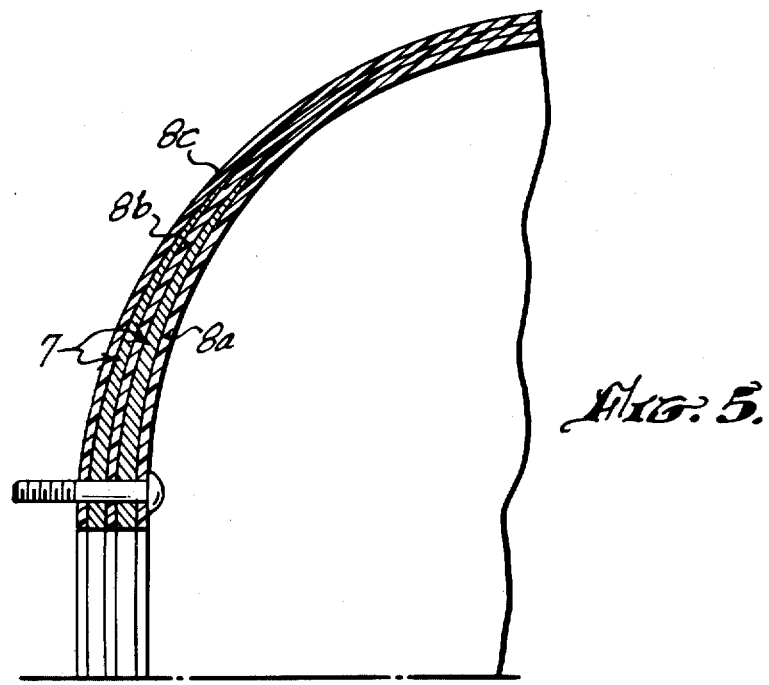
FIG. 5 is an enlarged partial view in section of one of the polar ends of the pressure vessel illustrated in FIG. 1.
Figure 6:
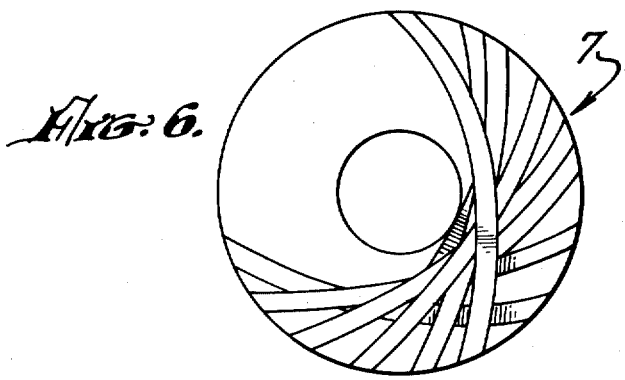
FIGS. 6 and 7 illustrate alternate mat constructions used to reinforce the polar end portions.
Figure 7:
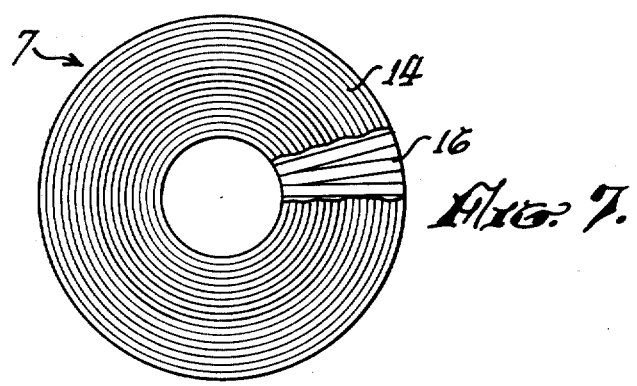

The method of the present invention includes the steps of first fabricating a filament wound pressure vessel in the form illustrated in FIG. 1. As will be described in some detail, the FIG. 1 vessel is a filament wound structure having a cylindrical body portion 1 and ovaloid polar end portions 2 and 3 each of which is provided with a polar opening 4 and 6 formed during the winding of the structure. The essential characteristics of the FIG. 1 structure are first the fact that the filament winding angle is constant or, in other words, undeviated throughout the winding procedure. Secondly, the end openings 4 and 6 are of precisely the same diameter. The next step of the method is to machine or cut polar ends 2 and 3 to provide end openings of whatever size is dictated by the design criteria. For purposes of the present invention, it is assumed that the design criteria requires one of the end openings to be larger than the other. Obviously, both end openings can be formed to the dimension of the smaller of the two end openings and, in this case, only one of the end openings need be machined. However, both openings may be machined and when a plurality of vessels is being formed, the diameter of the FIG. 1 polar openings can be the smallest of the diameters of the plurality of the vessels. FIGS. 2 and 3 illustrate the left and right hand polar end portions of the FIG. 1 vessel after the openings have been machined to size and, as will be noted, polar opening 6 of the right hand end portion is considerably larger than polar opening 4. Since the machining of the end openings to the required size involves cutting through the filament windings of the end portions, it is apparent that these end portions will be somewhat weakened and, consequently, will require reinforcement. For this purpose, during the winding operation of the FIG. 1 vessel, reinforcing wafers or mats 7 are interspersed between layers of the windings in the manner illustrated in FIG. 5. Specially-formed mats, such as are shown in FIGS. 6 and 7 are preferred, and, as indicated in FIG. 5, the mats extend up to the circumference of openings 4 and 6, so that, during the machining to size of the openings, portions of the mats as well as the filament are cut away.

As will be appreciated, the foregoing description primarily is intended as an abbreviated outline serving the purposes of introducing the invention as well as identifying essential configurations required during the formation of the present pressure vessel. The following description will consider the fabricating steps in greater detail.

The vessel of FIG. 1 generally can be considered as being formed of windings 8 of a fibrous material bound together by a settable binder which may be an appropriate resin or plastic. As shown in FIG. 5, the several or more layers of windings, identified as layers 8A, 8B, and 8C, may be employed. The resin, in addition to binding the fibrous material also fills any interstices that may exist between the windings or the layers. As far as the present invention is concerned, the type of material used for winding 8 is a matter of choice, although, for rocket motor chambers, graphite filament presently is preferred. Further, as regards the windings, although its form generally has been characterized as being filamentary, this term should not be considered as limiting since any desired form including that of a flat ribbon or a ribbon having a circular cross sectional form can used. For present purposes, winding 8 can be considered as being ribbon-like in form and also being composed of elements formed of a plurality of graphite filaments laid side-by-side.

Figure 4:
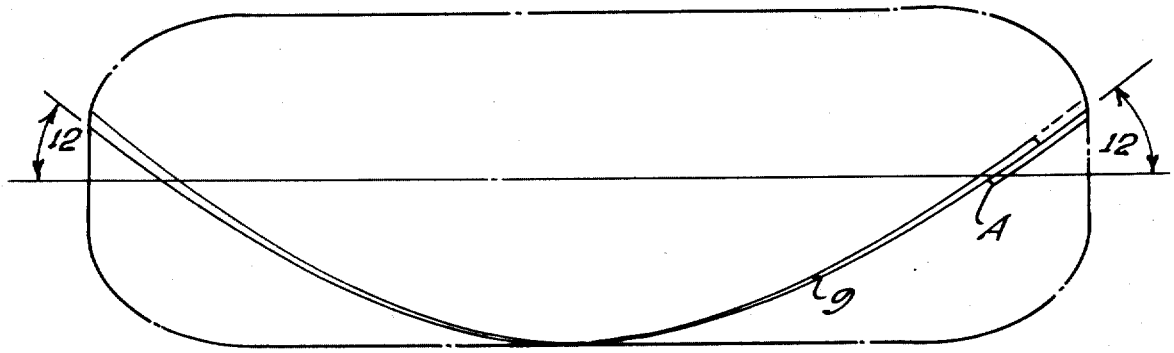
FIG. 4 is a view similar to FIG. 1 illustrating a preferred method of providing the desired constant helical winding angle.

The manner in which the windings 8 are controllably applied to provide the vessel structure is not of particular consequence providing the helical winding angle remains constant and further providing that the mat-reinforced openings 4 and 6 are formed during the winding process. However, one particularly suitable manner of forming the vessel is described in U.S. Pat. No. 3,047,191 "Filament Wound Vessels and Methods for Performing Same" issued July 31, 1962 to Richard E. Young. FIG. 4 is provided to illustrate the winding method disclosed in the Young Patent. In the disclosed technique, which is applicable to the initial or first step of present winding process, the filament or winding 8 is continuously wound about a mandrel 11 to finally provide the vessel structure shown in FIG. 1. Specifically, the winding may be considered as commencing at point A (FIG. 4). From this point the winding is applied to the mandrel by moving an applying carriage to the right as the mandrel is turned. The winding angle identified in FIG. 4 as angle 12, is the angle between the longitudinal axis of the vessel and the winding itself. This angle remains constant during the entire winding process. As also is shown, the winding angle is such as to carry filament to a point tangent to opening 6 at the right hand end of the mandrel. The travel of the carriage is then reversed and the winding, still at angle 12, travels across the far side of the mandrel to a point tangent to opening 4 at the left hand end of the mandrel. At this point, by appropriate controls, the winding returns to a position adjacent to its starting point A.

The path of travel shown in FIG. 4 represents one complete circuit of the winding which, upon return is repeated with successive circuits all maintaining the same winding angle. Also, each circuit passes tangentially to openings 4 and 6 so that in the final form the end or polar structure of the vessel appears as it is shown in FIG. 2. An important point to be noted is that since the vessel to be formed is entirely symmetrical in its curvature and its opening, the circuit of the winding can follow a geodesic, undeviated path to provide maximum strength and permits minimum use of the winding material. Efficiency in the fiber utilization is achieved since the geodesic winding provides adequate strength that needs no supplemental strengthening. In contrast, when a vessel design requires end openings of varying sizes, the winding angle must be deviated as it passes the length of the cylindrical portion and such deviations produce non-geodesic lines that require supplemental strengthening in the form of undesirable additional weight.

As also will be noted in FIG. 1 additional, so-called girth windings 13 may be employed to strengthen the elongate cylindrical body portion of the chamber. These girth windings are somewhat conventional, although they are not considered of any particular consequence insofar as the present invention is concerned. They can be applied directly on each layer of the helical winding 8 or, if desired, the helical layers can be applied and the girth windings subsequently added.

Another feature of the present invention is the fact that mats 7 are interspersed between each layer of the helical windings. Depending upon the intended use of the vessel, any number of mats as well as any number of helical layers can be employed. The reinforcing mats are used primarily to strengthen the machined polar end openings of the vessel. For this purpose, they should be disposed in such a manner that, when the end openings are machined, the mats extend to the periphery of the openings. Usually, a portion of the mats are machined along with the fibers of the vessel when the end openings are expanded to the design diameter.

Different mat constructions can be employed and, to some extent, the particular construction selected will depend upon the degree of reinforcement required. The mat constructions shown in FIGS. 6 and 7 are preferred and have been found suitable especially for use on pressure vessels which are to be employed as rocket motor chambers. In fact, as should be noted, the particular constructions of FIGS. 6 and 7 have been used for this purpose and their use as well as their construction is described in U.S. Pat. No. 3,866,792 entitled "Integral Filament Reinforced Composite-Rocket Chamber-/Adaptor" issued Feb. 18, 1975 to the present inventor. As disclosed in this patent, the mats primarily are used to strengthen polar end openings of rocket chamber motors. Prior to their use, the end openings were strengthened mostly by the use of separate metal flange collars which commonly were called 'adaptors' used to permit the attachement of chamber accessories, such as the nozzle and the igniter. One of the features of this issued patent is its recognition that its mat structures provide adequate strength for use as chamber adaptors. In particular, the patent discloses the use of mats or wafers formed of high modulus fibers, such as graphite fibers, "Kelvar — 49" and boron fibers, which do not stretch because of their high modulus of elasticity which is in the neighborhood of 20–60M psi.

FIG. 6 shows one type of graphite mat in which graphite tape having graphite fibers running lengthwise is laid in a series of strips. The interspacing of such graphite mats in the helical windings provides an attachment point or an adaptor which is dimensionally stable. FIG. 7 shows another mat construction having a layer of spiral hoop windings 14 of carbon fiber faced with glass fiber tape 16 oriented in a radial direction. Either of these mat constructions, when used to reinforce the machine end openings of the present vessel, provide sufficient strength and dimensional stability to accommodate the accessories to be attached to the vessel, and particularly to accommodate the accessories needed for a rocket motor chamber.

The advantages of the present invention should be apparent. As indicated, prior art manufacture of filament wound rocket motor chambers having different sized polar end openings has produced structures having excess weight and relatively poor efficiency of fiber utilization. The difficulty has been the need to deviate the winding angle to accommodate the different opening diameters. The present invention combines certain prior art techniques to completely resolve this problem. Further, the chamber that is produced is of a type that avoids the need for metal end opening adaptors such as are discussed in the previously mentioned Minke Patent. It also should be noted that the present fabrication procedure is applicable to manufacture of a large number of pressure vessels or rocket motor chambers even though the vessels so formed may differ one from the other in their opening sizes. In this event, the initial step of the process involves winding a plurality of vessels each of which have identically-sized openings having a diameter no greater than the smallest diameter required by the plurality.

Obviously many modifications and variations of the present invention are possible in the light of the above teachings. It is therefore to be understood that within the scope of the appended claims the invention may be practiced otherwise than as specifically described.

I claim:

1. A method of making a filament wound pressure vessel having a desired constant helical winding angle and having finally sized polar end openings one of which is larger than the other, comprising:
   windably forming an initial pressure vessel structure having a symetrical curvative formed by an elongate cylindrical body portion and ovaloid end portions having identically-sized polar end openings of a diameter no greater than the smaller of said finally sized openings,
   said vessel being formed by winding the filament of each layer at a constant helical angle across the length of said body portion and said end portions and said helical angle being one that constantly maintains a winding path that follows a geodesic line of the symetrically-arcuate surfaces being formed,
   reinforcing said polar ends of said initial vessel by interspersing a wafer-like mat between each of said filament layers, and
   matching at least one of said initial polar ends to enlarge its opening to the desired final size,
   said mats reinforceably encircling the edge portions of said finally-sized openings and being formed of material that is dimensionally stable under pressure vessel operating conditions.

2. The method of claim 1 wherein said mat material has a modulus of elasticity of $20 \times 10^6$ psi.

3. A method of making a plurality of filament-wound pressure vessels each having an identical constant helical winding angle and polar end openings of varying sizes, comprising:
   windably forming a plurality of initial pressure vessel structures each having a symetrical curvature formed by an elongate cylindrical body portion and ovaloid end portions having identically-sized polar end openings no greater than the smallest of said varying sizes,
   said vessels each being formed by winding the filament of each layer at a constant helical angle across the length of its body portion and its end portions and said helical angle being one that constantly maintains a winding path that follows a geodesic line of the symetrically-arcuate surfaces being formed,
   reinforcing said polar ends of said initial vessels by interspersing a wafer-like mat between each filament layer, and
   machining said initial openings to said varying sizes,
   said mats reinforcably encircling the end portions of said varying sized openings and being formed of a material that is dimensionally stable under pressure vessel operating conditions.

4. A filament-wound pressure vessel comprising:
   an elongate symmetrically-shaped vessel structure having a cylindrical body portion and a pair of symmetrically-ovaloid polar end portions each provided with a polar opening one of which is larger in diameter than the other,
   said vessel structure including:
   a plurality of filament layers each formed of a helical filament winding extending across said length and end portions of said vessel at a constant winding angle on a winding path that follows the geodesic line of said symmetrical length and end portions, and,
   a wafer-like mat disposed between each filament layer in closely encircling proximity to the edge portions of said polar openings,
   said mats being formed of a material that is dimensionally stable under pressure vessel operating conditions.

5. The pressure vessel of claim 4 wherein said vessel is rocket motor chamber and said material has a modulus of elasticity of $20 \times 10^6$ psi.

6. The pressure vessel of claim 5 wherein said mat is formed of helically-wound strips of graphite tape having graphite fibers running lengthwise of said strips.

7. The pressure vessel of claim 5 wherein said mat is formed of spiral-hoop carbon fiber windings faced with glass fiber tape oriented radially to said polar end openings.

* * * * *